United States Patent
Wang et al.

(10) Patent No.: US 8,808,589 B2
(45) Date of Patent: Aug. 19, 2014

(54) METHOD FOR MAKING A CARBON NANOTUBE FILM

(75) Inventors: Ding Wang, Beijing (CN); Chang-Hong Liu, Beijing (CN); Shou-Shan Fan, Beijing (CN)

(73) Assignees: Tsinghua University, Beijing (CN); Hon Hai Precision Industry Co., Ltd., New Taipei (TW)

( * ) Notice: Subject to any disclaimer, the term of this patent is extended or adjusted under 35 U.S.C. 154(b) by 1562 days.

(21) Appl. No.: 12/004,673

(22) Filed: Dec. 20, 2007

(65) Prior Publication Data
US 2014/0199855 A1 Jul. 17, 2014

(30) Foreign Application Priority Data
Apr. 13, 2007 (CN) .......................... 2007 1 0074027

(51) Int. Cl.
*B28B 1/26* (2006.01)

(52) U.S. Cl.
USPC ................................ 264/87; 264/442; 264/86

(58) Field of Classification Search
USPC ............................................ 264/442, 86, 87
See application file for complete search history.

(56) References Cited

U.S. PATENT DOCUMENTS

| 6,616,495 | B1 | 9/2003 | Tsuboi |
| 7,858,185 | B2 | 12/2010 | Sen et al. |
| 8,053,291 | B2 * | 11/2011 | Liu et al. ........................ 438/151 |
| 2004/0197546 | A1 * | 10/2004 | Rinzler et al. ........... 428/311.51 |
| 2005/0002851 | A1 * | 1/2005 | McElrath et al. .......... 423/447.3 |
| 2006/0137817 | A1 * | 6/2006 | Ma et al. ....................... 156/296 |

FOREIGN PATENT DOCUMENTS

| CN | 1475437 A | 2/2004 |
| CN | 1699283 A | 11/2005 |
| TW | 200508601 | 3/2005 |
| TW | 200600452 | 1/2006 |
| TW | 200618857 | 6/2006 |
| TW | 200714361 | 4/2007 |
| WO | WO 2006137893 A2 * | 12/2006 |

OTHER PUBLICATIONS

Fan et al., "Self oriented regular arrays of carbon nanotubes and their field emission properties", Science 283, 512 (Jan. 1999), p. 512-514.*
Li et al.,,Preparation and Characterization of Multiwalled Carbon Nanotube-Supported Platinum for Cathode Catalysts of Direct Methanol Fuel Cells, J.Phys.Chem.B,Jun. 6, 2003,pp. 6292-6299,vol. 107,No. 26.

\* cited by examiner

*Primary Examiner* — Galen Hauth
(74) *Attorney, Agent, or Firm* — Novak Druce Connolly Bove + Quigg LLP

(57) ABSTRACT

A method for making a carbon nanotube film includes the steps of: (a) adding a plurality of carbon nanotubes to a solvent to create a carbon nanotube floccule structure in the solvent; (b) separating the carbon nanotube floccule structure from the solvent; and (c) shaping the separated carbon nanotube floccule structure to obtain the carbon nanotube film.

17 Claims, 3 Drawing Sheets adding a plurality of carbon nanotubes to a solvent to create a carbon nanotube floccule structure in the solvent;

↓ separating the carbon nanotube floccule structure from the solvent;

↓ shaping the separated carbon nanotube floccule structure to obtain the carbon nanotube film.

FIG. 1

METHOD FOR MAKING A CARBON NANOTUBE FILM

RELATED APPLICATIONS

This application is related to a commonly-assigned application Ser. No. 12/004,671 entitled, "METHOD FOR MAKING A CARBON NANOTUBE FILM", filed Dec. 20, 2007. Disclosure of the above-identified application is incorporated herein by reference.

BACKGROUND

1. Field of the Invention

The invention relates generally to carbon nanotube films and, particularly, to a method for making a carbon nanotube film.

2. Discussion of Related Art

Carbon nanotubes (CNTs) produced by means of arc discharge between graphite rods were first discovered and reported in an article by Sumio Iijima, entitled "Helical Microtubules of Graphitic Carbon" (Nature, Vol. 354, Nov. 7, 1991, pp. 56-58). CNTs are electrically conductive along their length, chemically stable, and capable, individually, of having a very small diameter (much less than 100 nanometers) and large aspect ratios (length/diameter). Due to these and other properties, it has been suggested that CNTs can play an important role in various fields, such as field emission devices, new optic materials, sensors, soft ferromagnetic materials, etc.

Carbon nanotube film has been found especially useful in field emission electron sources, photoelectric and biological sensors, transparent electrical conductors, battery electrodes, absorbing materials, water purification materials, light emitting material, and related devices. Thus, methods for making the carbon nanotube film have been become the basis for applications in the above-described fields. Currently, carbon nanotube film can be made by a method of direct growth.

Moreover, the carbon nanotube film can also be made by methods using carbon nanotube powders, such as a dropping and drying solvent method, a Langmuir-blodgett (L-B) method, a printing method, an electrophoresis method, a membrane filter method, etc. However, the above-described methods generally have complicated fabrication procedures. Thus, in use, such methods have proven less efficient than truly desirable. Furthermore, the carbon nanotube films produced by the above-described methods have poor tensile strength and/or toughness. Thus, the carbon nanotube films are susceptible to fracture.

What is needed, therefore, is a method for making a carbon nanotube film, that is very simple, efficient, and produces a film whose toughness is excellent.

SUMMARY

A method for making a carbon nanotube film includes the steps of: (a) adding a plurality of carbon nanotubes to a solvent to create a carbon nanotube floccule structure in the solvent; (b) separating the carbon nanotube floccule structure from the solvent; and (c) shaping the separated carbon nanotube floccule structure into the carbon nanotube film.

Other advantages and novel features of the present method for making a carbon nanotube film will become more apparent from the following detailed description of presents embodiments when taken in conjunction with the accompanying drawings.

BRIEF DESCRIPTION OF THE DRAWINGS

Many aspects of the present method for making a carbon nanotube film can be better understood with reference to the following drawings. The components in the drawings are not necessarily to scale, the emphasis instead being placed upon clearly illustrating the principles of the present method for making a carbon nanotube film.

FIG. 1 is a flow chart of a method for making a carbon nanotube film, in accordance with a present embodiment.

Figure 2:
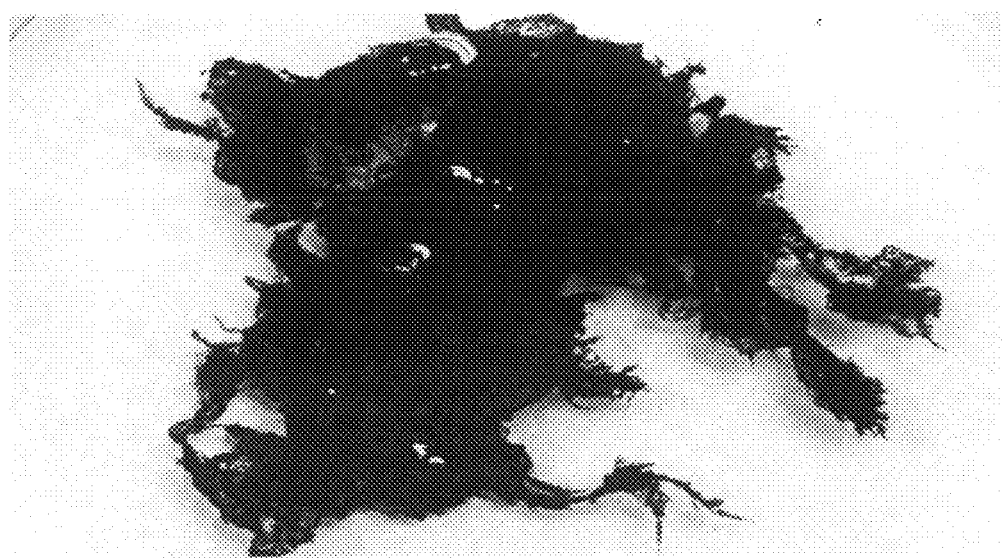
FIG. 2 shows a Scanning Electron Microscope (SEM) image of a carbon nanotube floccule structure formed by the method of FIG. 1.

Corresponding reference characters indicate corresponding parts throughout the several views. The exemplifications set out herein illustrate at least one preferred embodiment of the present method for making a carbon nanotube film, in at least one form, and such exemplifications are not to be construed as limiting the scope of the invention in any manner.

DETAILED DESCRIPTION OF PREFERRED EMBODIMENTS

Reference will now be made to the drawings to describe, in detail, embodiments of the present method for making a carbon nanotube film.

Referring to FIG. 1, a method for making/producing a carbon nanotube film includes the following steps: (a) adding a plurality of carbon nanotubes to a solvent to create a carbon nanotube floccule structure in the solvent; (b) separating the carbon nanotube floccule structure from the solvent, and (c) shaping the separated carbon nanotube floccule structure into the carbon nanotube film.

In step (a), the plurality of carbon nanotubes is formed in this embodiment by the substeps of: (a1) providing a substantially flat and smooth substrate; (a2) forming a catalyst layer on the substrate; (a3) annealing the substrate with the catalyst layer in air at a temperature in the approximate range from 700° C. to 900° C. for about 30 to 90 minutes; (a4) heating the substrate with the catalyst layer to a temperature in the approximate range from 500° C. to 740° C. in a furnace with a protective gas therein; (a5) supplying a carbon source gas to the furnace for about 5 to 30 minutes and growing a super-aligned array of carbon nanotubes on the substrate; and (a6) separating the array of carbon nanotubes from the substrate to get the plurality of carbon nanotubes.

In step (a1), the substrate can, beneficially, be a P-type silicon wafer, an N-type silicon wafer, or a silicon wafer with a film of silicon dioxide thereon. Preferably, a 4-inch P-type silicon wafer is used as the substrate.

In step (a2), the catalyst can, advantageously, be made of iron (Fe), cobalt (Co), nickel (Ni), or any alloy thereof.

In step (a4), the protective gas can, beneficially, be made up of at least one of nitrogen ($N_2$), ammonia ($NH_3$), and a noble gas. In step (a5), the carbon source gas can be a hydrocarbon gas, such as ethylene ($C_2H_4$), methane ($CH_4$), acetylene ($C_2H_2$), ethane ($C_2H_6$), or any combination thereof.

The super-aligned array of carbon nanotubes can, opportunely, have a height above 100 microns and include a plurality of carbon nanotubes parallel to each other and approximately perpendicular to the substrate. Because the length of the carbon nanotubes is very long, portions of the carbon nanotubes are bundled together. Moreover, the super-aligned array of carbon nanotubes formed under the above conditions is essentially free of impurities such as carbonaceous or residual catalyst particles. The carbon nanotubes in the super-aligned array are closely packed together by the van der Waals attractive force.

In step (a6), the array of carbon nanotubes is scraped from the substrate by a knife or other similar devices to obtain the plurality of carbon nanotubes. Such a raw material is, to a certain degree, able to maintain the bundled state of the carbon nanotubes.

In step (a), the solvent is selected from the group consisting of water and volatile organic solvent. After adding the plurality of carbon nanotubes to the solvent, a process of flocculating the carbon nanotubes is executed to create the carbon nanotube floccule structure. The process of flocculating the carbon nanotubes is selected from the group consisting of ultrasonic dispersion of the carbon nanotubes and agitating the carbon nanotubes. Quite usefully, in this embodiment ultrasonic dispersion is used to flocculate the solvent containing the carbon nanotubes for about 10-30 minutes. Due to the carbon nanotubes in the solvent having a large specific surface area and the bundled carbon nanotubes having a large van der Waals attractive force, the flocculated and bundled carbon nanotubes form a network structure (i.e., floccule structure).

In step (b), the process of separating the floccule structure from the solvent includes the substeps of: (b1) filtering out the solvent to obtain the carbon nanotube floccule structure; and (b2) drying the carbon nanotube floccule structure to obtain the separated carbon nanotube floccule structure.

In step (b2), a time of drying can be selected according to practical needs. Referring to FIG. 2, the carbon nanotube floccule structure on the filter is bundled together, so as to form an irregular flocculate structure.

In step (b), the process of shaping includes the substeps: (b3) putting the separated carbon nanotube floccule structure into a container (not shown), and spreading the carbon nanotube floccule structure to form a predetermined structure; (b4) pressing the spread carbon nanotube floccule structure with a certain pressure to yield a desirable shape; and (b5) removing the residual solvent contained in the spread floccule structure to form the carbon nanotube film.

It is to be understood that the size of the spread floccule structure is, advantageously, used to control a thickness and a surface density of the carbon nanotube film. As such, the larger the area of the floccule structure, the less the thickness and density of the carbon nanotube film. In the embodiment, the thickness of the carbon nanotube film is in the approximate range from 1 micron to 2 millimeters.

Further, the step (b) and step (c) can be accomplished by a process of pumping and filtering the carbon nanotube floccule structure to obtain the carbon nanotube film. The process of pumping filtration includes the substeps of: (b1') providing a microporous membrane and an air-pumping funnel; (b2') filtering out the solvent from the flocculated carbon nanotubes through the microporous membrane using the air-pumping funnel; and (b3') air-pumping and drying the flocculated carbon nanotubes attached on the microporous membrane.

In step (b1'), the microporous membrane has a smooth surface. And the aperture/diameters of micropores in the membrane are about 0.22 microns. The pumping filtration can exert air pressure on the floccule structure, thus, forming a uniform carbon nanotube film. Moreover, due to the microporous membrane having a smooth surface, the carbon nanotube film can, beneficially, be easily separated.

Figure 3:
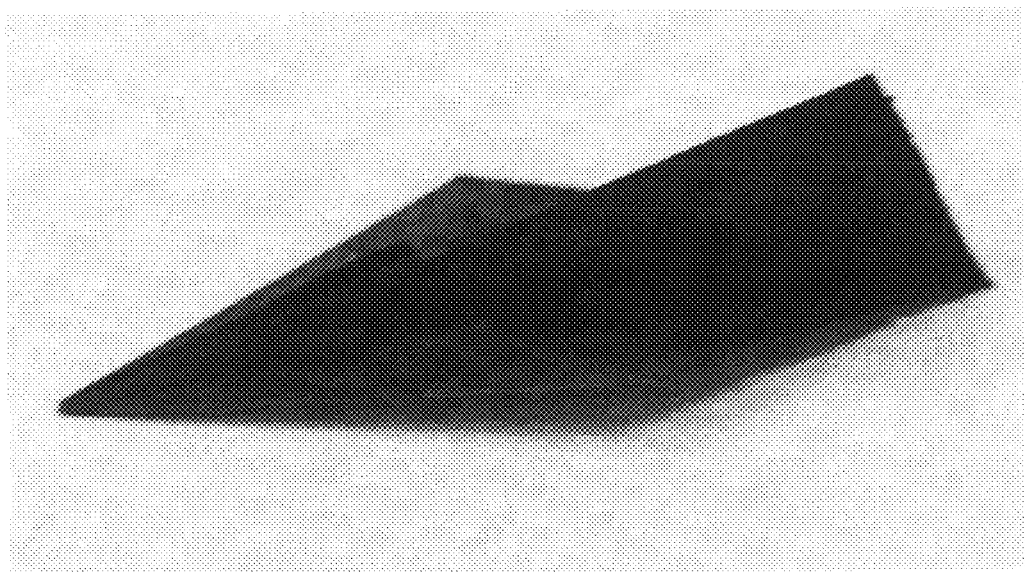
FIG. 3 shows a Scanning Electron Microscope (SEM) image of a carbon nanotube film formed by the method of FIG. 1 wherein the carbon nanotube film has a predetermined shape.

Referring to FIG. 3, bundling of the carbon nanotubes in the carbon nanotube film, provides strength to the carbon nanotube film. Therefore, the carbon nanotube film is, advantageously, easy to be folded and/or bended into arbitrary shapes without rupture.

The carbon nanotube film produced by the method has the following virtues. Firstly, through flocculating, the carbon nanotubes are bundled together by van der Walls attractive force to form a network structure/floccule structure. Thus, the carbon nanotube film is very tough. Secondly, the carbon nanotube film is very simply and efficiently produced by the method. A result of the production process of the method, is that thickness and surface density of the carbon nanotube film are controllable.

Finally, it is to be understood that the above-described embodiments are intended to illustrate rather than limit the invention. Variations may be made to the embodiments without departing from the spirit of the invention as claimed. The above-described embodiments illustrate the scope of the invention but do not restrict the scope of the invention.

What is claimed is:

1. A method for making a carbon nanotube film, the method comprising:
   (a) adding a plurality of carbon nanotubes to a solvent to form a carbon nanotube floccule structure, the plurality of carbon nanotubes being formed by:
      growing an array of the plurality of carbon nanotubes formed on a substrate, the plurality of carbon nanotubes are bundled together in the array, and
      separating the plurality of carbon nanotubes from the substrate while maintaining a bundled state of the plurality of carbon nanotubes;
   (b) separating the carbon nanotube floccule structure from the solvent to obtain a separated carbon nanotube floccule structure; and
   (c) shaping the separated carbon nanotube floccule structure into the carbon nanotube film.

2. The method as claimed in claim 1, wherein in step (a), after adding the plurality of carbon nanotubes to the solvent, a process of flocculating the plurality of carbon nanotubes is executed to create the carbon nanotube floccule structure.

3. The method as claimed in claim 2, wherein the process of flocculating the plurality of carbon nanotubes is agitating the plurality of carbon nanotubes.

4. The method as claimed in claim 1, wherein in step (a), the solvent is selected from the group consisting of water and volatile organic solvent.

5. The method as claimed in claim 1, wherein in step (b), the separating includes substeps of:
   filtering out the solvent to obtain the carbon nanotube floccule structure; and
   drying the carbon nanotube floccule structure to obtain the separated carbon nanotube floccule structure.

6. The method as claimed in claim 1, wherein in step (b), the shaping comprises substeps of:
   putting the separated carbon nanotube floccule structure into a container, and spreading the separated carbon nanotube floccule structure to form a predetermined structure;
   pressing the predetermined structure to yield a desired shape; and
   removing a residual solvent contained in the predetermined structure to form the carbon nanotube film.

7. The method as claimed in claim 1, wherein a thickness of the carbon nanotube film is in the approximate range from 1 micron to 2 millimeters.

8. A method for making a carbon nanotube film, the method comprising:

(a) adding a plurality of carbon nanotubes to a solvent to form a carbon nanotube floccule structure, the plurality of carbon nanotubes being formed by:
grown an array of the plurality of carbon nanotubes formed on a substrate, the plurality of carbon nanotubes are bundled together in the array, and
separating the plurality of carbon nanotubes from the substrate while maintaining a bundled state of the plurality of carbon nanotubes,
wherein the plurality of carbon nanotubes of the carbon nanotube floccule structure are flocculated and bundled to form a network structure; and
(b) pumping and filtering the carbon nanotube floccule structure to obtain the carbon nanotube film;
wherein the plurality of carbon nanotubes of the carbon nanotube floccule structure are combined by van der Waals attractive forces.

9. The method as claimed in claim 8, wherein the process of pumping and filtering comprises the substeps of:
providing a microporous membrane and an air-pumping funnel;
filtering out the solvent from the flocculated carbon nanotubes through the microporous membrane using the air-pumping funnel; and
air-pumping and drying the flocculated carbon nanotubes attached on the microporous membrane.

10. The method as claimed in claim 8, wherein the plurality of carbon nanotubes of the array are packed together by van der Waals attractive force.

11. The method as claimed in claim 8, wherein the array of the plurality of carbon nanotubes is formed by sub-steps of:
providing the substrate being substantially flat and smooth;
forming a catalyst layer on the substrate;
annealing the substrate with the catalyst layer in air at a temperature in the approximate range from 700° C. to 900° C. for about 30 to 90 minutes;
heating the substrate with the catalyst layer to a temperature in the approximate range from 500° C. to 740° C. in a furnace with a protective gas therein; and
supplying a carbon source gas to the furnace for about 5 to 30 minutes and growing a super-aligned array of carbon nanotubes on the substrate.

12. The method as claimed in claim 1, wherein the array of the plurality of carbon nanotubes is formed by sub-steps of:
providing the substrate being substantially flat and smooth;
forming a catalyst layer on the substrate;
annealing the substrate with the catalyst layer in air at a temperature in the approximate range from 700° C. to 900° C. for about 30 to 90 minutes;
heating the substrate with the catalyst layer to a temperature in the approximate range from 500° C. to 740° C. in a furnace with a protective gas therein; and
supplying a carbon source gas to the furnace for about 5 to 30 minutes and growing a super-aligned array of carbon nanotubes on the substrate.

13. The method as claimed in claim 12, wherein the substrate is selected from the group consisting of: a P-type silicon wafer, an N-type silicon wafer, and a silicon wafer with a film of silicon dioxide thereon.

14. The method as claimed in claim 12, wherein the catalyst layer comprises a material selected from the group consisting of iron (Fe), cobalt (Co), nickel (Ni), and any alloy thereof.

15. The method as claimed in claim 12, wherein the protective gas comprises a material selected from the group consisting of nitrogen ($N_2$), ammonia ($NH_3$), and a noble gas.

16. The method as claimed in claim 12, wherein the carbon source gas comprises a material selected from the group consisting of ethylene ($C_2H_4$), methane ($CH_4$), acetylene ($C_2H_2$), ethane ($C_2H_6$), and any combination thereof.

17. The method as claimed in claim 8, wherein the adding the plurality of carbon nanotubes to the solvent forms a mixture consisting of the plurality of carbon nanotubes and the solvent, the carbon nanotube floccule structure is formed in the mixture.

\* \* \* \* \*